(12) United States Patent
Cassells et al.

(10) Patent No.: US 11,529,674 B2
(45) Date of Patent: Dec. 20, 2022

(54) REFRACTORY METAL CORE FINISHING TECHNIQUE

(71) Applicant: UNITED TECHNOLOGIES CORPORATION, Farmington, CT (US)

(72) Inventors: Dewight R. Cassells, East Hartford, CT (US); Alan C. Barron, Jupiter, FL (US); John P. Rizzo, Vernon, CT (US); Gordon Miller Reed, Plantsville, CT (US); Tracy A. Propheter-Hinckley, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 15 days.

(21) Appl. No.: 16/808,529

(22) Filed: Mar. 4, 2020

(65) Prior Publication Data

US 2020/0238368 A1    Jul. 30, 2020

Related U.S. Application Data

(62) Division of application No. 15/034,612, filed as application No. PCT/US2014/062545 on Oct. 28, 2014, now Pat. No. 10,744,557.

(Continued)

(51) Int. Cl.
*B22C 9/18* (2006.01)
*B22C 9/10* (2006.01)
(Continued)

(52) U.S. Cl.
CPC ............... *B22C 9/18* (2013.01); *B22C 9/10* (2013.01); *B22C 9/24* (2013.01); *F01D 5/12* (2013.01); *F01D 5/187* (2013.01); *F01D 9/02* (2013.01); *F04D 29/324* (2013.01); *F04D 29/542* (2013.01); *G01B 11/303* (2013.01); *G01N 19/04* (2013.01); *F05D 2220/32* (2013.01);
(Continued)

(58) Field of Classification Search
CPC .... B22C 9/18; B22C 9/10; B22C 9/24; F01D 5/12; F01D 5/187; F01D 9/02; F05D 2220/32; F05D 2230/10; F05D 2230/21; F05D 2240/81; F05D 2260/204; F04D 29/324; F04D 29/542; G01B 11/303; G01N 19/04; Y02T 50/60
See application file for complete search history.

(56) References Cited

U.S. PATENT DOCUMENTS 5,248,386 A * 9/1993 Dastolfo, Jr ........... C23G 1/106
                                                        216/41
5,660,885 A * 8/1997 Hasz ....................... F01D 5/288
                                                        427/374.5

(Continued)

*Primary Examiner* — Christopher J Besler
*Assistant Examiner* — Christine Bersabal
(74) *Attorney, Agent, or Firm* — Carlson, Gaskey & Olds, P.C.

(57) ABSTRACT

A refractory metal core (RMC) finishing method according to an exemplary aspect of the present disclosure includes, among other things, performing a plurality of finishing operations on a plurality of RMC samples, analyzing one or more properties of at least a portion of the plurality of RMC samples and selecting a combination of finishing operations for generating an RMC having desirable properties for manufacturing a part free from defects.

20 Claims, 4 Drawing Sheets

Related U.S. Application Data

(60) Provisional application No. 61/902,400, filed on Nov. 11, 2013.

(51) Int. Cl.
    *B22C 9/24*       (2006.01)
    *F01D 5/18*       (2006.01)
    *F01D 5/12*       (2006.01)
    *G01B 11/30*     (2006.01)
    *G01N 19/04*     (2006.01)
    *F01D 9/02*       (2006.01)
    *F04D 29/32*     (2006.01)
    *F04D 29/54*     (2006.01)

(52) U.S. Cl.
    CPC ...... *F05D 2230/10* (2013.01); *F05D 2230/21* (2013.01); *F05D 2240/81* (2013.01); *F05D 2260/204* (2013.01); *Y02T 50/60* (2013.01)

(56) References Cited

U.S. PATENT DOCUMENTS

| | | | |
|---|---|---|---|
| 7,784,183 B2* | 8/2010 | Rockstroh | F01D 25/00 29/889.71 |
| 2007/0227683 A1* | 10/2007 | Judge | B22C 9/10 164/28 |
| 2009/0282677 A1* | 11/2009 | Korn | F01D 5/005 29/889.1 |

\* cited by examiner

REFRACTORY METAL CORE FINISHING TECHNIQUE

CROSS-REFERENCE TO RELATED APPLICATION

This application is a divisional of U.S. application Ser. No. 15/034,612, which was filed on May 5, 2016, which is a 371 of International Application No. PCT/US2014/062545, which was filed Oct. 28, 2014, which claims priority to U.S. Provisional Application No. 61/902,400, which was filed on Nov. 11, 2013.

STATEMENT REGARDING FEDERALLY SPONSORED RESEARCH OR DEVELOPMENT

This invention was made with government support under Contract No. N00019-12-D-0002-4Y01 awarded by the United States Navy. The Government therefore has certain rights in this invention.

BACKGROUND

This disclosure relates to refractory metal cores (RMC's). More particularly, this disclosure is directed to RMC finishing methodologies for providing an RMC having tailored properties for manufacturing a gas turbine engine part that is substantially free from defects.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other loads.

Both the compressor and turbine sections may include alternating rows of rotating blades and stationary vanes that extend into the core flow path of the engine. Due to exposure to hot combustion gases, these components often include cooling circuits that receive and circulate cooling airflow for cooling the component. Some cooling circuits utilize microcircuits that are disposed inside the component to create a dual wall configuration.

Microcircuits and other cooling circuit technologies are commonly created using a RMC in conjunction with a ceramic core. Sharp edge breaks and the surface finish (i.e., rough, smooth, etc.) of the RMC are factors that can influence the quality of the component ultimately cast using the RMC.

SUMMARY

A refractory metal core (RMC) finishing method according to an exemplary aspect of the present disclosure includes, among other things, performing a plurality of finishing operations on a plurality of RMC samples, analyzing one or more properties of at least a portion of the plurality of RMC samples and selecting a combination of finishing operations for generating an RMC having desirable properties for manufacturing a part free from defects.

In a further non-limiting embodiment of the foregoing method, the part is a gas turbine engine casting.

In a further non-limiting embodiment of either of the foregoing methods, the one or more properties include at least break edge sharpness and surface finish.

In a further non-limiting embodiment of any of the foregoing methods, the defects include at least one of alloying, spallation and recrystallization.

In a further non-limiting embodiment of any of the foregoing methods, the plurality of finishing operations include a first harperizing process performed for a first amount of time and a second harperizing process performed for a second, different amount of time.

In a further non-limiting embodiment of any of the foregoing methods, the plurality of finishing operations include a robotic machining process.

In a further non-limiting embodiment of any of the foregoing methods, the plurality of finishing operations include at least two of harperizing, robotic machining, and etching.

In a further non-limiting embodiment of any of the foregoing methods, the method includes the step of performing a plurality of validation operations on the plurality of RMC samples after the step of performing the plurality of finishing operations.

In a further non-limiting embodiment of any of the foregoing methods, the plurality of validation operations include at least one of a pull test, a furnace test and a casting process.

In a further non-limiting embodiment of any of the foregoing methods, the method includes the step of analyzing data concerning the RMC samples using a computer system.

A method according to another exemplary aspect of the present disclosure includes, among other things, performing a plurality of finishing operations on a plurality of refractory metal core (RMC) samples, measuring break edge and surface finish properties associated with at least a portion of the plurality of RMC samples, performing validation operations on the portion of the plurality of RMC samples and selecting a combination of finishing operations for generating an RMC having desirable properties for casting a part free from defects.

In a further non-limiting embodiment of the foregoing method, the step of performing the plurality of finishing operations includes performing a first finishing operation on a first portion of the plurality of RMC samples to round break edges and performing a second finishing operation on a second portion of the plurality of RMC samples to round break edges.

In a further non-limiting embodiment of either of the foregoing methods, the method includes performing a third finishing operation on a first subset of the first portion of the plurality of RMC samples and a first subset of the second portion of the plurality of RMC samples to alter the surface finish properties of the first subsets of RMC samples and performing a fourth finishing operation on a second subset of the first portion of the plurality of RMC samples and a second subset of the second portion of the plurality of RMC samples to alter the surface finish properties of the second subsets of RMC samples.

In a further non-limiting embodiment of any of the foregoing methods, the step of performing the validation operations includes pull testing a first portion of the plurality of RMC samples to assess coating adhesion, furnace testing a second portion of the plurality of RMC samples to assess coating adhesion or casting a third portion of the plurality of RMC samples to assess casting defects.

In a further non-limiting embodiment of any of the foregoing methods, the plurality of finishing operations include at least harperizing, robotic machining and etching.

A refractory metal core (RMC) finishing system according to another exemplary aspect of the present disclosure includes, among other things, a first finishing system configured to influence a first property of a RMC, at least a second finishing system different from the first finishing system and configured to influence at least a second, different property of the RMC and a computer system configured to analyze the properties of the RMC.

In a further non-limiting embodiment of the foregoing system, the first finishing system is a harperizing system.

In a further non-limiting embodiment of either of the foregoing systems, the second finishing system is an etching system.

In a further non-limiting embodiment of any of the foregoing systems, the first finishing system is a robotic machining system.

In a further non-limiting embodiment of any of the foregoing systems, the robotic machining system includes a tool connected to an arm of a robot, the robot configured to apply a specified force against the tool and move the tool at a specified speed for rounding a break edge of the RMC.

The embodiments, examples and alternatives of the preceding paragraphs, the claims, or the following descriptions and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to RMC finishing techniques. In one finishing method, a plurality of finishing operations may be performed on a plurality of RMC samples. One or more properties of each RMC sample may be analyzed following each finishing operation. Based on an analysis of these properties, a combination of finishing operations may be chosen for providing a RMC having desirable properties for manufacturing a gas turbine engine part that is substantially free from defects. These and other features are discussed in greater detail herein.

Figure 1:
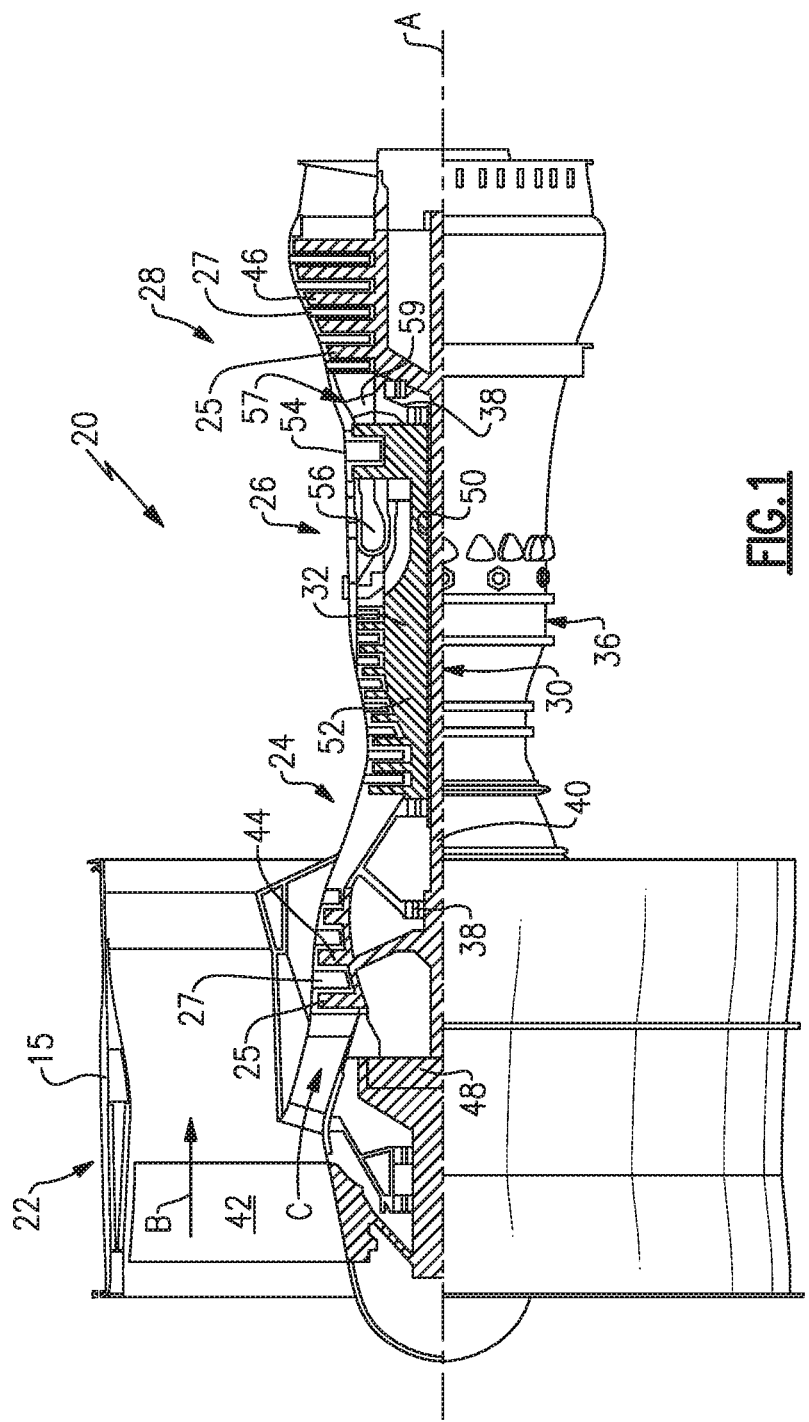
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \,°\, R)/(518.7°\, R)]^{0.5}$. The "Low corrected fan tip speed" as disclosed herein according to one non-limiting embodiment is less than about 1150 ft/second.

The compressor section 24 and/or the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core air flow that is communicated through the gas turbine engine 20 along the core flow path C. The vanes 27 of the vane assemblies direct the core airflow to the blades 25 to either add or extract energy.

Various components of the gas turbine engine 20, such as airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. RMC's for creating these types of internal cooling circuits as well as a plurality of finishing operations for preparing the RMC's to include desirable properties are discussed in greater detail below.

Figure 2A:
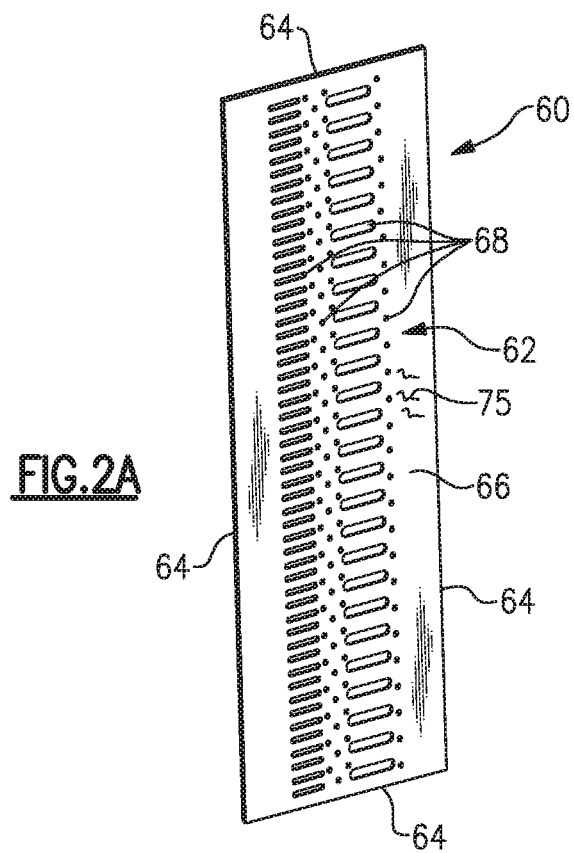
FIGS. 2A and 2B illustrate an exemplary RMC.
Figure 2B:
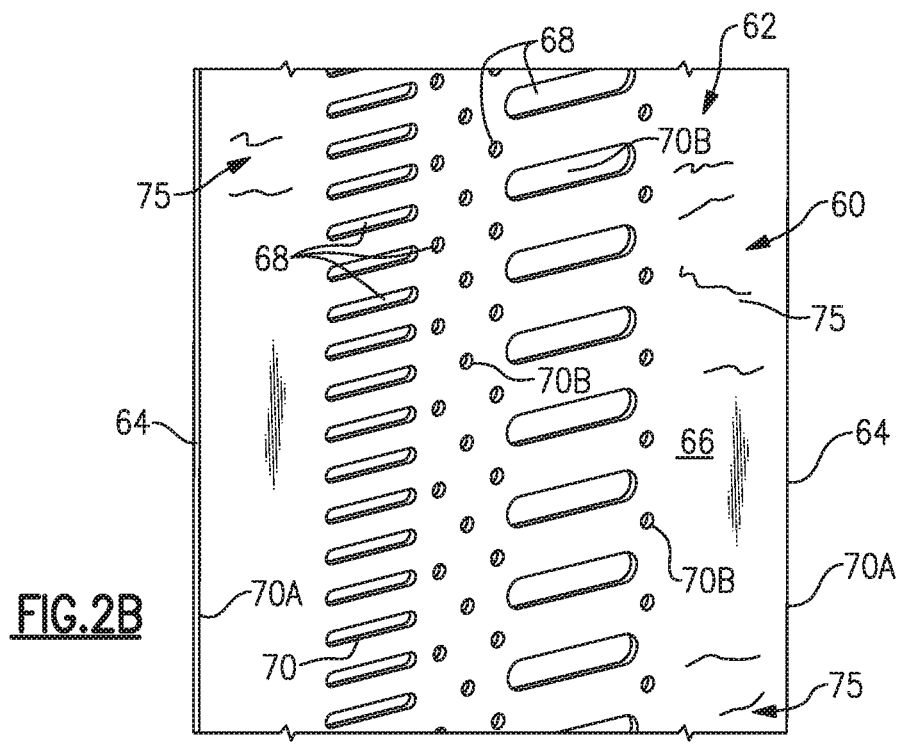

FIGS. 2A and 2B illustrate a RMC 60 that may be employed in a casting procedure to manufacture a gas turbine engine part that includes an internal cooling circuit. In one non-limiting embodiment, the RMC 60 is used in an investment casting process to create microcircuit cooling schemes inside of blades, vanes or other gas turbine engine parts that may benefit from dedicated cooling. The RMC 60 could also be used to create other intricate cooling configurations within the scope of this disclosure.

The RMC 60 may be made of any type of refractory metal. Exemplary refractory metals include, but are not limited to, molybdenum alloys, tungsten alloys, niobium alloys, tantalum alloys and rhenium alloys. Refractory metals are more ductile than ceramic materials and therefore can provide advantages for casting smaller, more intricate geometries compared to the use of ceramic cores alone.

In one embodiment, the RMC 60 includes a body 62 having an outer surface 66 that extends between opposed outer edges 64. The outer edges 64 may include leading, trailing, top and/or bottom edges. The body 62 terminates at the outer edges 64.

A plurality of openings 68 may be formed through the body 62. The openings 68 form desired details of the microcircuitry (i.e., pedestals, pins, passages, etc.) inside the part that is to be cast. The size, shape and configuration of the openings 68 shown in FIGS. 2A and 2B are depicted for exemplary purposes only and in no way limit this disclosure. In other words, the RMC 60 could be used to form any microcircuitry design inside of a cast part.

Referring to FIG. 2B, the body 62 may include a plurality of break edges 70. For example, break edges 70A may be formed where the body 62 terminates at the outer edges 64, and break edges 70B may exist where the openings 68 exit the outer surface 66. Sharp break edges can cause recrystallization during the casting process. The outer surface 66 of the RMC 60 may also define a surface finish 75. The surface finish 75 is a property of the RMC 60 describing the roughness of the outer surface 66. Surface finish is an important factor that can effect spallation in a cast part. Therefore, it may become desirable to perform finishing operations on the RMC 60 in order to manufacture a part free from defects that include spallation, recrystallization or other defects.

Figure 3:
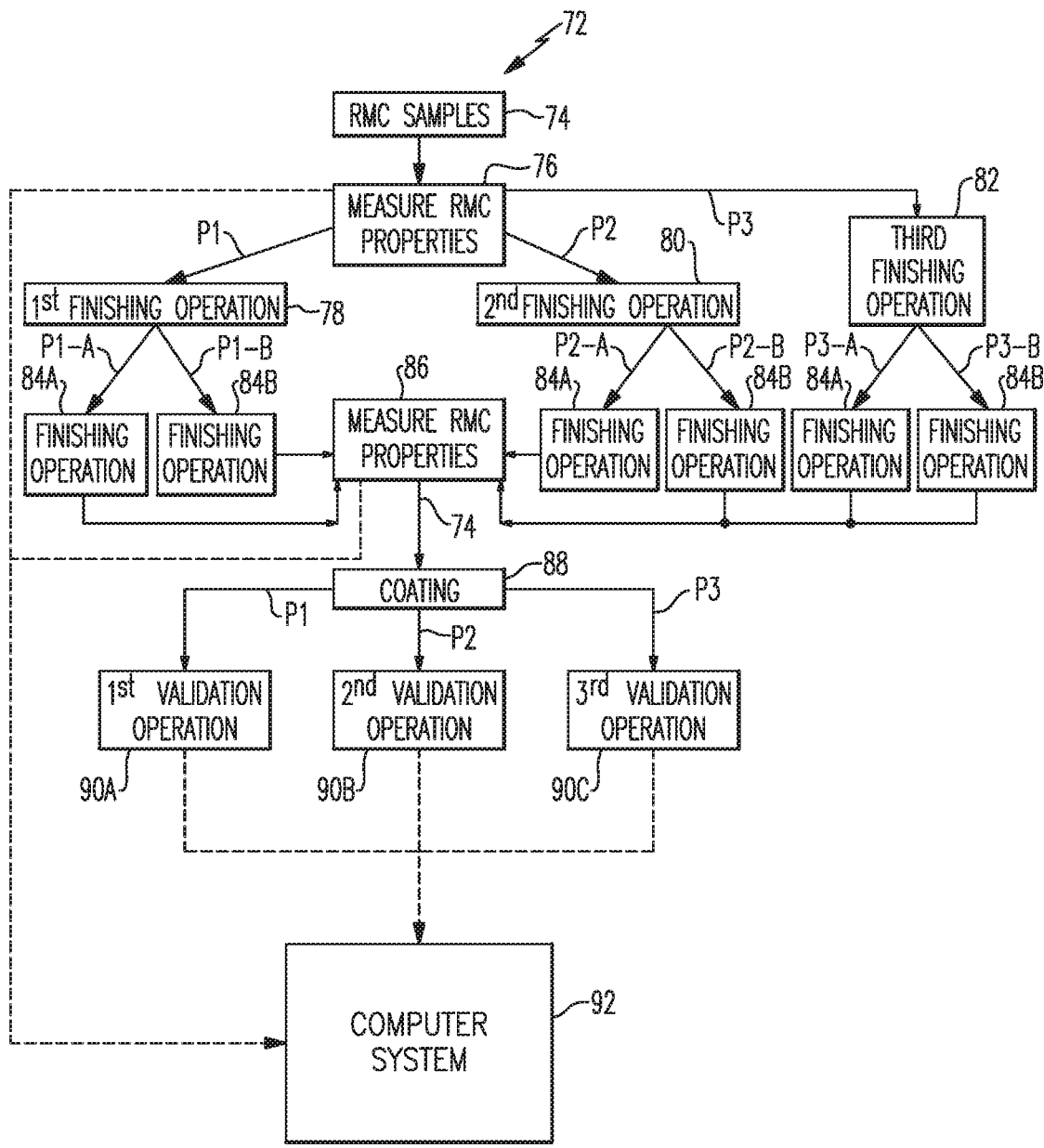
FIG. 3 schematically illustrates a RMC finishing method.

FIG. 3 schematically illustrates a RMC finishing method 72. The RMC finishing method 72 may be performed in order to select an appropriate combination of finishing operations for producing a RMC having ideal properties for use in a casting process to manufacture a gas turbine engine part that is substantially free from defects such as alloying, recrystallization, etc. For example, the RMC's may undergo one or more finishing operations in order to achieve certain break edge roundness and surface finish characteristics. Other RMC properties may additionally or alternatively be tailored to achieve a desired casting outcome, including but not limited to, consistently matt finished surfaces with rounded edges.

The RMC finishing method 72 may be performed on a plurality of RMC samples 74. Each RMC sample 74 may be similar to the RMC 60 of FIGS. 2A and 2B, although other designs are also contemplated. In one non-limiting embodiment, one hundred RMC samples 74 are employed in the RMC finishing method 72. However, the sample size could include any number of RMC samples 74.

At block 76 of the RMC finishing method, one or more properties of each RMC sample 74 is measured or otherwise monitored. For example, the sharpness of break edges and the surface finish of each RMC sample 74 may be measured. In one non-limiting embodiment, measuring the break edges provides an indication of how sharp each edge is, whereas measuring the surface finish provides an indication of how smooth or rough the outer surface of each RMC sample 74 is.

In one embodiment, an optical instrument is used to measure the break edge sharpness as well as the surface finish. Optical instruments may include 3-D sensors, robots and other automated components for providing relatively fast and accurate measurement of the properties of the RMC samples 74. Other measurement instruments are also contemplated as within the scope of this disclosure.

The RMC samples 74 may next be split (i.e., divided) into portions P1, P2 and P3. Each portion P1, P2 and P3 undergoes a different finishing operation 78, 80 and 82, respectively. Although three sample portions and three finishing operations are shown, the RMC finishing method 72 could employ any amount of finishing operations. In addition, although specific types of finishing operations are described below, any finishing operation may by employed to finish the RMC samples 74 in order to influence a property of the RMC.

In one non-limiting embodiment, the first portion P1 of the RMC samples 74 are subjected to the first finishing operation 78, the second portion P2 of the RMC samples 74 are subjected to the second finishing operation 80, and the third portion P3 are subjected to the third finishing operation 82. The RMC samples 74 may be divided in any manner between the first finishing operation 78, the second finishing operation 80, and the third finishing operation 82, including by subjecting an equal or different amount of RMC samples 74 to each respective finishing operation 78, 80 and 82.

In one embodiment, the first finishing operation 78 is a harperizing process that is performed for a first amount of time, such as two hours, and the second finishing operation 80 is a harperizing process that is performed for a second amount of time different than the first harperizing process 78, such as 16 hours. These times may be adjusted per design criteria and, in one embodiment, may be set to capture a minimum and a maximum variation of a particular process. Harperizing is a high speed tumbling process that counter rotates a cylinder and a base in order to cause an abrasive medium to rub against the parts to achieve a desired finish on the parts. In this case, the harperizing processes can be used to round break edges of the first and second portions P1, P2 of the RMC samples 74.

Figure 4:
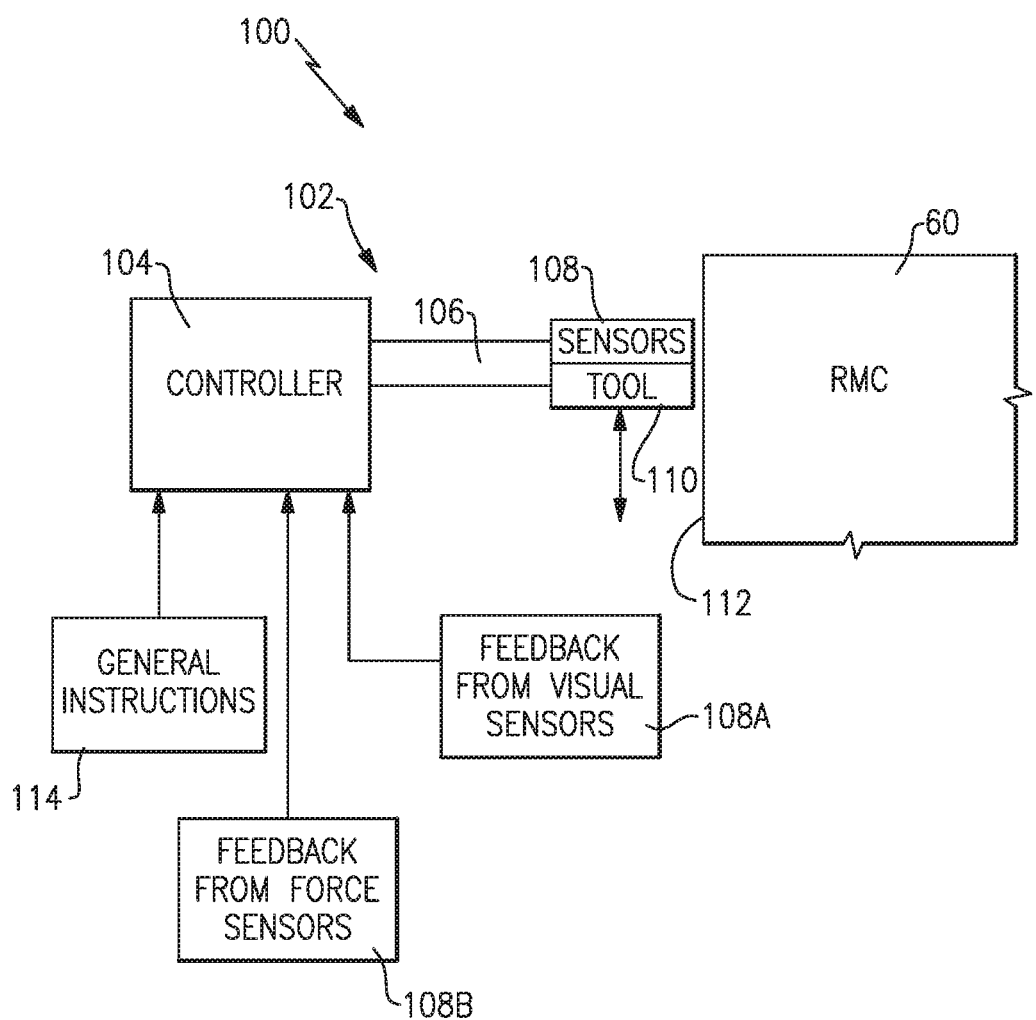
FIG. 4 illustrates one exemplary finishing system for performing a finishing operation on a RMC.

The third finishing operation 82 may be a robotic machining process. One example of a robotic machining process is illustrated in FIG. 4. The third finishing operation 82 may round break edges of the third portion P3 of the RMC samples 74, in this embodiment. Of course, other operation besides harperizing and robotic machining may also fall within the scope of this disclosure.

Additional finishing operations may be performed on each portion P1, P2 and P3 of the RMC samples 74 after undergoing the first finishing operation 78, the second finishing operation 80 and the third finishing operation 82. For example, a first subset P1-A of the first portion P1 of RMC samples 74 may undergo another finishing operation 84A while a second subset P1-B of the first portion P2 of RMC samples 74 may undergo a finishing operation 84B. Similarly, subsets P2-A and P2-B of portion P2 and subsets P3-A and P3-B of portion P3 may also be subjected to additional finishing operations 84A, 84B.

In one embodiment, the finishing operations 84A, 84B are etching operations, such as chemical etching operations. The finishing operations 84A, 84B may differ from one another in that they are performed for different durations. In one non-limiting embodiment, the durations are set to capture a minimum and a maximum variation of the etching process. The finishing operations 84A, 84B are used to alter the surface finish of the RMC samples 74, in this embodiment.

The RMC samples 74 are measured again at block 86. The RMC samples 74 may be measured using the same equipment used at block 78.

Next, at block 88, each RMC sample 74 is coated with a suitable coating. Exemplary coatings include, but are not limited to, alumina. The coatings may be applied in any known manner and are used to protect the RMC during a subsequent casting process.

Following the coating step at block 88, the RMC samples 74 undergo one or more validation operations 90A, 90B and 90C. The RMC samples 74 may be split up in any manner between the validation operations 90A, 90B and 90C. In other words, any number of the RMC samples 74 may undergo each of the validation operations 90A, 90B and 90C. In this embodiment, a first portion P1 of the RMC samples 74 undergo the first validation operation 90A, a second portion P2 undergo the second validation operation 90B and a third portion P3 undergo the third validation operation 90C. Of course, each RMC sample 74 would be tracked such that the previous finishing operations performed on that particular sample would be readily identifiable.

In one non-limiting embodiment, the first validation operation 90A is a pull test. The pull test utilizes an adhesive force to attempt to pull off the coating from the RCM sample 74. The force required to pull off the coating is measured and evaluated to determine whether adhesion of the coating is adequate.

The second validation operation 90B may include a furnace test for testing coating adhesion. In a furnace test, the RMC sample 74 is cycled up and down in a temperature range similar to the temperatures the RMC sample 74 would be exposed to during the casting process.

In yet another embodiment, the third validation operation 90C is a casting process. During this operation, a portion P3 of the RMC samples 74 are used in a casting process to manufacture a gas turbine engine part. The cast part is analyzed to note signs of spallation, alloying, recrystallization or other defects. Of course, other validation operations could also be used within the scope of this disclosure.

The measurements taken at block 76 and block 88 and the results of the validation operations 90A, 90B and 90C are next communicated to a computer system 92. The computer system 92 is configured to assess this data to capture an ideal proportion of edge rounding and surface finish on the RMC. In other words, based on the gathered data, a combination of finishing operations may be chosen for providing a RMC having desirable properties for manufacturing a gas turbine engine part that is substantially free from defects.

The computer system 92 includes the necessary hardware and software for analyzing the collected RMC data. In one non-limiting embodiment, the computer system 92 may execute Minitab® software for analyzing the various measurements and properties of the RMC samples 74. Other software may additionally or alternatively be utilized.

FIG. 4 schematically illustrates an exemplary robotic machining system 100 that can be used to perform a finishing operation on a component, such as an RMC 60. In one embodiment, the robotic machining system 100 is utilized to round break edges that exist on the RMC 60. However, this disclosure could extend to other applications.

In one embodiment, the robotic machining system 100 may include a robot 102 having a controller 104 and an arm 106. The robotic machining system 100 may further include at least one sensor 108 and a tool 110 near a free end or other location of the arm 106. The robot 102 can move the arm 106 to position the tool 110 relative to a surface 112 of the RMC 60. The tool 110 is movable (via the arm 106) along the surface 112 of the RMC 60, such as to round a sharp break edge of the RMC 60. In one embodiment, the tool 110 is a bristle for removing sharp break edges of the RMC 60.

In one embodiment, the at least one sensor 108 includes a force feedback sensor and a visual sensor. Other sensors can additionally be included, as desired, and this disclosure is not limited to any particular number of sensors. Regarding the force feedback sensor, this disclosure extends to all types of force feedback sensors (or "touch" sensors), including capacitive sensors, electromagnetic sensors, and piezoelectric sensors, as non-limiting examples. Regarding the visual sensors, this disclosure extends to all types of visual sensors including optical sensors that include cameras and/or fiber optics. Further, the visual sensors do not need to be attached to the free end of the arm 106, and can instead be positioned in some other manner relative to the tool 110.

The controller 104 may be programmed with general instructions 114 for machining the RMC 60. In one embodiment, the general instructions 114 include at least an identification of the surface 112 that is to be followed by the tool 110. The surface 112 may include a break edge of the RMC 60. In another embodiment, the general instructions 114 include at least an amount of force to be applied against the surface 112 by the tool 110. In yet another embodiment, the general instructions 114 include both an identification of the surface 112 that is to be followed by the tool 110 as well as the amount of force to be applied against the surface 112 by the tool 110. In other words, the robotic machining system 100 is either pressure sensitive, visually sensitive or both. The controller 104 could alternatively or additionally be programmed to include and execute other instructions.

During machining, feedback from the sensors 108, illustrated schematically at 108A and 108B, is provided to the controller 104 for operating the robot 102. The robot 102 can sense where the surface 112 of the RMC 60 is and follow the sensed surface 112 in response to feedback from the visual sensors 108A. In addition, the robot 102 can sense the amount of force that is being applied against the surface 112 by the tool 110 in response to feedback from the force sensors 108B. In one embodiment, the arm 106 is actuated to apply the desired amount of a specified force against the surface 112 with the tool 110 and to move the tool 110 at a controlled speed across the surface 112 to remove sharp break edges. In one embodiment, the specified force is a constant force and the specified speed is a constant speed.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   measuring at least one property of a plurality of refractory metal core (RMC) samples;
   splitting the plurality of RMC samples into a first portion and a second portion different from the first portion;
   performing a first finishing operation on the first portion; and
   performing a second finishing operation on the second portion;
   wherein the measuring at least one property of the plurality of RMC samples includes measuring sharpness of break edges and a surface finish of the plurality of RMC samples.

2. The method as recited in claim 1, comprising:
   coating the plurality of RMC samples.

3. The method as recited in claim 1, comprising:
   performing at least one validation operation on the plurality of RMC samples.

4. The method as recited in claim 3, wherein the at least one validation operation includes at least one of furnace testing and casting.

5. The method as recited in claim 1, wherein the splitting the plurality of RMC samples into a first portion and a second portion different from the first portion includes splitting the plurality of RMC samples into a first portion, a second portion different from the first portion, and a third portion different from the first portion and the second portion.

6. The method as recited in claim 5, the method comprising:
   robotic machining the third portion.

7. The method as recited in claim 1, wherein the first finishing operation includes a harperizing process performed for a first amount of time, and the second finishing operation includes a harperizing process performed for a second amount of time different from the first amount of time.

8. The method as recited in claim 7, wherein the splitting the plurality of RMC samples into a first portion and a second portion different from the first portion includes splitting the plurality of RMC samples into a first portion, a second portion different from the first portion, and a third portion different from the first portion and the second portion.

9. The method as recited in claim 8, the method comprising:
   robotic machining the third portion to round break edges of the third portion.

10. The method as recited in claim 9, comprising:
    coating the plurality of RMC samples.

11. The method as recited in claim 10, comprising:
    performing at least one validation operation on the plurality of RMC samples.

12. The method as recited in claim 1, wherein the first finishing operation is different from the second finishing operation.

13. The method as recited in claim 1, wherein the splitting step is performed based on results from the measuring step.

14. The method as recited in claim 13, wherein the first and second finishing operations are performed to provide the plurality of RMC samples for manufacturing a part that is free from at least one of alloying, spallation and recrystallization.

15. The method as recited in claim 1, the method comprising:
    robotic machining the second portion to round break edges of the second portion.

16. The method as recited in claim 15, wherein the robotic machining comprises moving a tool with a robotic arm along surfaces of the second portion to round break edges, wherein the tool comprises a bristle.

17. The method as recited in claim 16, wherein the robotic machining comprises sensing the amount of force applied by the tool against the surfaces.

18. The method as recited in claim 17, where the splitting step is performed based on the measuring step, and the first and second finishing operations are performed to provide the plurality of RMC samples for manufacturing a part that is free from at least one of alloying, spallation and recrystallization.

19. The method as recited in claim 18, wherein the first finishing operation is different from the second finishing operation.

20. The method as recited in claim 1, wherein the splitting step is performed based on results from the first measuring step, the first finishing operation is performed for a first duration, the second finishing operation is performed for a second duration from the first duration, and the first and second finishing operations are performed to provide the plurality of RMC samples for manufacturing a part that is free from at least one of alloying, spallation and recrystallization.

\* \* \* \* \*